US011092480B2

(12) United States Patent
Garrett et al.

(10) Patent No.: US 11,092,480 B2
(45) Date of Patent: Aug. 17, 2021

(54) LIGHT OBSTRUCTION SENSOR

(71) Applicant: International Business Machines Corporation, Armonk, NY (US)

(72) Inventors: Tynan J. Garrett, Poughkeepsie, NY (US); Andrew Hicks, Wappingers Falls, NY (US); Michael P. Lyons, Poughkeepsie, NY (US); Miles C. Pedrone, Wappingers Falls, NY (US); Yunli Tang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 16/144,284

(22) Filed: Sep. 27, 2018

(65) Prior Publication Data
US 2020/0103274 A1    Apr. 2, 2020

(51) Int. Cl.
    *G01J 1/18*      (2006.01)
    *B60Q 1/00*      (2006.01)
    *B60S 1/08*      (2006.01)

(52) U.S. Cl.
    CPC ............. *G01J 1/18* (2013.01); *B60Q 1/0023* (2013.01); *B60S 1/08* (2013.01); *B60Q 2300/45* (2013.01); *G01J 2001/186* (2013.01)

(58) Field of Classification Search
    CPC ......... G01J 1/18; G01J 2001/186; B60S 1/08; B60Q 1/0023; B60Q 2300/45;
(Continued)

(56) References Cited

U.S. PATENT DOCUMENTS

| 4,859,867 | A | * | 8/1989 | Larson | ............... B60S 1/0818 |
| | | | | | 307/10.1 |
| 4,867,561 | A | * | 9/1989 | Fujii | ............... B60H 1/00785 |
| | | | | | 356/239.8 |

(Continued)

OTHER PUBLICATIONS

Florida Department of Transportation, Technical Report Jan. 2013, "Crash and Safety Testing Standard for Paratransit Buses Acquired for the State of Florida", Headlight Obstruction Evaluation, 2013, 32 pgs.

(Continued)

*Primary Examiner* — Mohamed K Amara
(74) *Attorney, Agent, or Firm* — Cantor Colburn LLP; Teddi Maranzano

(57) ABSTRACT

Light obstruction can be detected using a light obstruction sensor. In one example implementation according to aspects of the present disclosure, a computer-implemented method includes receiving, by a light obstruction sensor, light being emitted by a light source, a light level being associated with the light, and the light source and the light obstruction sensor being disposed in a light assembly. The method further includes determining, by a processing device, whether the light level exceeds a first threshold. The method further includes, responsive to determining that the light level exceeds the first threshold, determining that the light being emitted by the light source is at least partially impaired by an object. The method further includes validating, by the processing device, the determination that the light source is at least partially impaired by the object to confirm whether the light source is at least partially impaired by the object.

17 Claims, 5 Drawing Sheets

(58) Field of Classification Search
CPC .................... B60Q 1/143; B60Q 2300/41;
B60Q 2300/42; G06K 9/00825; G06K
9/4604; H05B 45/10; H05B 47/105
See application file for complete search history.

(56) References Cited

U.S. PATENT DOCUMENTS

| | | | | |
|---|---|---|---|---|
| 5,703,568 | A * | 12/1997 | Hegyi | B60S 1/0818 |
| | | | | 340/602 |
| 6,084,519 | A * | 7/2000 | Coulling | B60S 1/0818 |
| | | | | 15/250.001 |
| 6,097,023 | A * | 8/2000 | Schofield | B60N 2/002 |
| | | | | 250/208.1 |
| 6,118,383 | A * | 9/2000 | Hegyi | B60S 1/0818 |
| | | | | 15/DIG. 15 |
| 6,307,198 | B1 * | 10/2001 | Asakura | B32B 17/10036 |
| | | | | 250/227.25 |
| 6,313,457 | B1 * | 11/2001 | Bauer et al. | B60R 1/088 |
| | | | | 250/214 C |
| 6,404,490 | B2 * | 6/2002 | Blasing | B60S 1/0822 |
| | | | | 250/227.25 |
| 6,462,350 | B1 * | 10/2002 | Stenkamp | G01N 21/53 |
| | | | | 250/573 |
| 7,196,305 | B2 | 3/2007 | Shaffer et al. | |
| 7,838,836 | B2 * | 11/2010 | Robert | B60Q 1/0023 |
| | | | | 250/341.7 |
| 8,170,286 | B2 * | 5/2012 | Kashimura | G06K 9/00791 |
| | | | | 382/104 |
| 2004/0004456 | A1 * | 1/2004 | LeBa | B60S 1/0822 |
| | | | | 318/482 |
| 2006/0155469 | A1 * | 7/2006 | Kawasaki | G01S 13/931 |
| | | | | 701/301 |
| 2008/0169912 | A1 * | 7/2008 | Kawasaki | G06K 9/00805 |
| | | | | 340/425.5 |
| 2008/0170754 | A1 * | 7/2008 | Kawasaki | G06K 9/00805 |
| | | | | 382/104 |
| 2010/0213847 | A1 * | 8/2010 | Biondo | B60Q 1/085 |
| | | | | 315/82 |
| 2011/0267467 | A1 * | 11/2011 | Kimura | H04N 9/097 |
| | | | | 348/148 |
| 2012/0182425 | A1 * | 7/2012 | Higgins-Luthman | B60Q 1/085 |
| | | | | 348/148 |
| 2013/0131922 | A1 * | 5/2013 | Ogata | G08G 1/165 |
| | | | | 701/36 |
| 2013/0207543 | A1 * | 8/2013 | Tatara | B60Q 1/08 |
| | | | | 315/81 |
| 2014/0022068 | A1 * | 1/2014 | Usami | B60Q 1/143 |
| | | | | 340/436 |
| 2014/0091710 | A1 * | 4/2014 | Ehlgen | B60Q 1/085 |
| | | | | 315/82 |
| 2014/0293055 | A1 * | 10/2014 | Otsuka | G08G 1/166 |
| | | | | 348/148 |
| 2014/0355280 | A1 * | 12/2014 | Fujiyoshi | B60Q 1/04 |
| | | | | 362/465 |
| 2014/0355827 | A1 * | 12/2014 | Ogawa | B60Q 1/143 |
| | | | | 382/103 |
| 2015/0002015 | A1 * | 1/2015 | Hayakawa | B60Q 1/08 |
| | | | | 315/82 |
| 2015/0117715 | A1 * | 4/2015 | Murao | G06K 9/38 |
| | | | | 382/104 |
| 2016/0090024 | A1 | 3/2016 | Nagasawa | |
| 2016/0288699 | A1 | 10/2016 | Solar et al. | |
| 2017/0008455 | A1 * | 1/2017 | Goudy | G08G 1/097 |
| 2017/0144587 | A1 * | 5/2017 | Ogawa | B60Q 1/143 |
| 2019/0084507 | A1 * | 3/2019 | Nishijima | G06K 9/00818 |
| 2019/0202342 | A1 * | 7/2019 | Yan | B60Q 1/143 |
| 2020/0055442 | A1 * | 2/2020 | Epperlein | B60Q 1/143 |

OTHER PUBLICATIONS

Authors et al.: Disclosed Anonymously, "Adaptive Array Headlight", An IP.com Prior Art Database Technical Disclosure, http://ip.com/IPCOM/000237783D, Jul. 10, 2014, 2 pgs.

Authors et al.: IBM, "System and Method of Intelligent Headlight Control Using a Two-Level Decision Framework", An IP.com Prior Art Database Technical Disclosure, http://ip.com/IPCOM/000177533D, Dec. 17, 2008, 4 pgs.

* cited by examiner

LIGHT OBSTRUCTION SENSOR

BACKGROUND

The present invention generally relates to lights, and more specifically, to a light obstruction sensor.

A vehicle (e.g., a car, truck, bus, van, motorcycle, airplane, helicopter, etc.), can be equipped with one or more light assemblies, such as headlights, brake lights, turn signals, navigational lights, warning lights, and the like. These light assemblies are used to illuminate dark areas so that an operator of the vehicle can see areas outside (or inside) the vehicle and so that others around the vehicle can be made aware of the presence of the vehicle.

SUMMARY

Embodiments of the present invention are directed to a computer-implemented method for detecting light obstruction using a light obstruction sensor. A non-limiting example of the computer-implemented method includes receiving, by a light obstruction sensor, light being emitted by a light source, a light level being associated with the light, and the light source and the light obstruction sensor being disposed in a light assembly. The method further includes determining, by a processing device, whether the light level exceeds a first threshold. The method further includes, responsive to determining that the light level exceeds the first threshold, determining that the light being emitted by the light source is at least partially impaired by an object. The method further includes validating, by the processing device, the determination that the light source is at least partially impaired by the object to confirm whether the light source is at least partially impaired by the object.

Embodiments of the present invention are directed to a system. A non-limiting example of the system includes a vehicle comprising a first headlight assembly and a second headlight assembly, the first headlight assembly comprising a first light source and a first light obstruction sensor, and the second headlight assembly comprising a second light source and a second light obstruction sensor. The system further includes a memory comprising computer readable instructions and a processing device for executing the computer readable instructions for performing a method for detecting light obstruction using a light obstruction sensor. A non-limiting example of the method includes receiving, by the first light obstruction sensor, first light being emitted by the first light source, a first light level being associated with the first light. The method further includes receiving, by the second light obstruction sensor, second light being emitted by the second light source, a second light level being associated with the first light. The method further includes comparing, by the processing device, the first light level and the second light level to determine whether at least one of the first light source and the second light source is at least partially impaired by an object.

Embodiments of the invention are directed to a computer program product. A non-limiting example of the computer program product includes a computer readable storage medium having program instructions embodied therewith. The program instructions are executable by a processor to cause the processor to perform a method for detecting light obstruction using a light obstruction sensor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
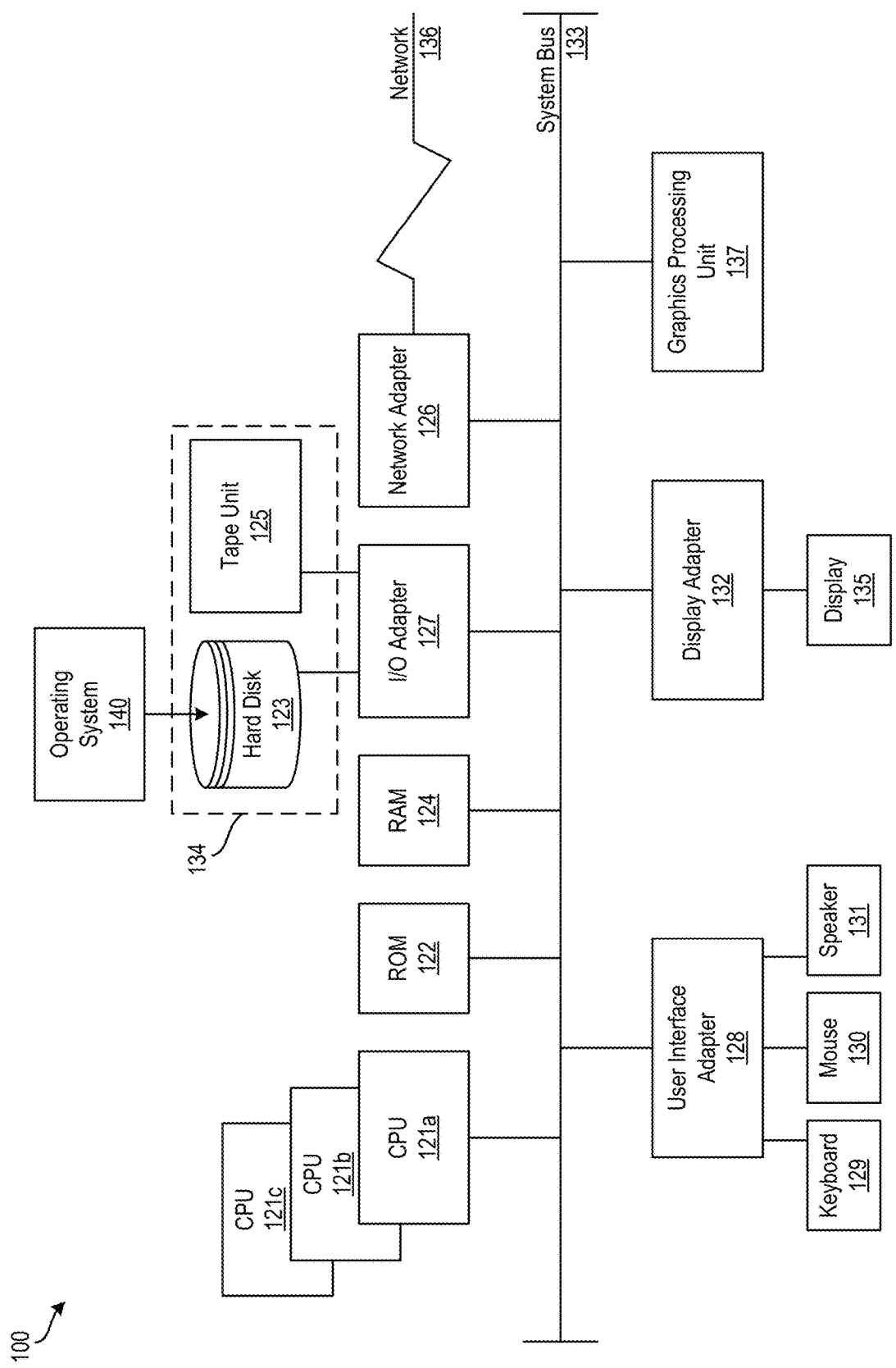
FIG. 1 depicts a block diagram of a processing system for implementing the techniques described herein according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood that the present disclosure is capable of being implemented in conjunction with any other type of computing environment now known or later developed. For example, FIG. 1 depicts a block diagram of a processing system 100 for implementing the techniques described herein. In examples, processing system 100 has one or more central processing units (processors) 121a, 121b, 121c, etc. (collectively or generically referred to as processor(s) 121 and/or as processing device(s)). In aspects of the present disclosure, each processor 121 can include a reduced instruction set computer (RISC) microprocessor. Processors 121 are coupled to system memory (e.g., random access memory (RAM) 124) and various other components via a system bus 133. Read only memory (ROM) 122 is coupled to system bus 133 and may include a basic input/output system (BIOS), which controls certain basic functions of processing system 100.

Further depicted are an input/output (I/O) adapter 127 and a network adapter 126 coupled to system bus 133. I/O adapter 127 may be a small computer system interface (SCSI) adapter that communicates with a hard disk 123 and/or a tape storage drive 125 or any other similar component. I/O adapter 127, hard disk 123, and tape storage device 125 are collectively referred to herein as mass storage 134. Operating system 140 for execution on processing system 100 may be stored in mass storage 134. The network adapter 126 interconnects system bus 133 with an outside network 136 enabling processing system 100 to communicate with other such systems.

A display (e.g., a display monitor) 135 is connected to system bus 133 by display adapter 132, which may include a graphics adapter to improve the performance of graphics intensive applications and a video controller. In one aspect of the present disclosure, adapters 126, 127, and/or 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 may be interconnected to system bus 133 via user interface adapter 128, which may include, for example, a Super I/O chip integrating multiple device adapters into a single integrated circuit.

In some aspects of the present disclosure, processing system 100 includes a graphics processing unit 137. Graphics processing unit 137 is a specialized electronic circuit designed to manipulate and alter memory to accelerate the creation of images in a frame buffer intended for output to a display. In general, graphics processing unit 137 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 121, storage capability including system memory (e.g., RAM 124), and mass storage 134, input means such as keyboard 129 and mouse 130, and output capability including speaker 131 and display 135. In some aspects of the present disclosure, a portion of system memory (e.g., RAM 124) and mass storage 134 collectively store an operating system such as the AIX® operating system from IBM Corporation to coordinate the functions of the various components shown in processing system 100.

Turning now to an overview of technologies that are more specifically relevant to aspects of the invention, a light obstruction sensor is used to detect light obstruction of a light assembly. Light assemblies, such as headlight assemblies, brake light assemblies, etc., are common in vehicles and are especially useful when the vehicle is operated in dark or dim conditions. For example, headlight assemblies are used to illuminate areas around and in front of a vehicle at night so that an operator can see what is in front of the vehicle. However, if a light assembly is broken or is obstructed/impaired by an object, such as leaves, snow, etc., their usefulness diminishes. For example, if an object is obstructing a light assembly, the light assembly is not as effective at producing light and having the light be visible than it otherwise might. In such cases, the operator of the vehicle may not be aware of the impairment.

Existing light assembly monitoring technologies use circuit detection to detect whether a light source in the light assembly is on or off (i.e., working or broken). For example, the resistance of a circuit can be measured, where infinite resistance implies that the light source is broken or otherwise not working. However, these technologies are unable to detect diminished usefulness of the light assembly due to impairment, such as from objects like leaves, snow, etc.

Turning now to an overview of the aspects of the invention, one or more embodiments of the invention address the above-described shortcomings of the prior art by utilizing a light obstruction sensor to determine whether a light assembly is obstructed or impaired. The light obstruction sensor and a light source are disposed in a light assembly. The light obstruction sensor receives light being emitted by a light source, and a light level is associated with the light that is emitted by the light source. It can be determined whether the light level exceeds a first threshold. If so, it is determined that the light being emitted by the light source is at least partially impaired by an object. This determination can be validated to confirm whether the light source is at least partially impaired by the object by comparing the light level to a reference light level.

The above-described aspects of the invention address the shortcomings of the prior art by detecting obstruction/impairment of a light assembly using a light obstruction sensor. This can be particularly useful when the obstruction occurs over a longer period of time (e.g., a few hours), such as caused by snow accumulating on a surface of a light assembly while a vehicle is being driven. The obstruction of the light assembly may not be readily apparent to the operator because it is occurring over a longer period of time, but the obstruction may cause diminished operational effectiveness of the light assembly. This can cause unsafe operating conditions. Accordingly, the present techniques represent a technical solution that represents an improvement over existing light assembly monitoring technologies. A user can be alerted to the obstruction/impairment and/or a corrective action can be taken to remedy the obstruction/impairment, such as causing a wiper associated with the light assembly to remove the obstruction/impairment automatically.

Figure 2:
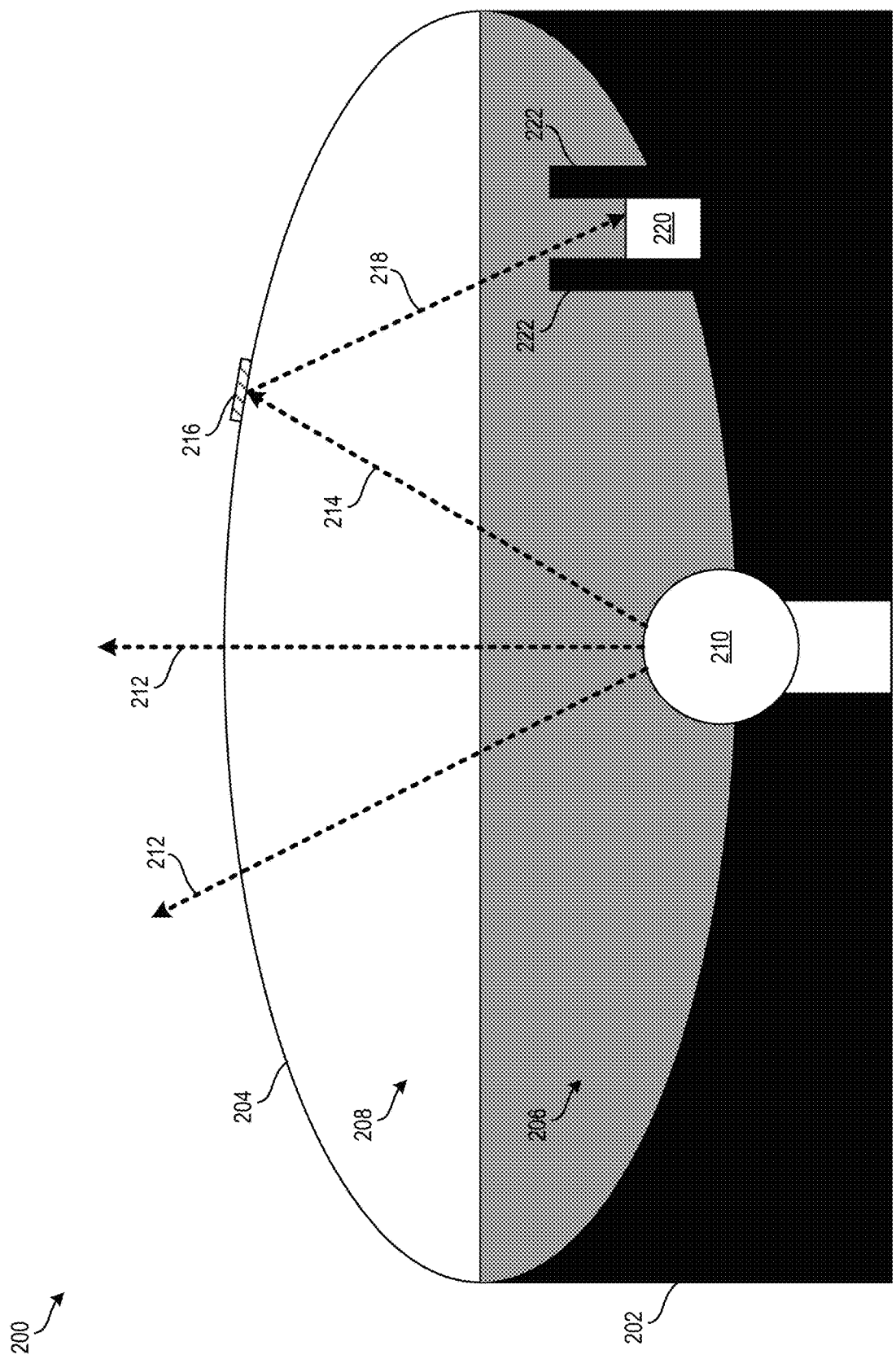
FIG. 2 depicts a headlight assembly having a light source and a light obstruction sensor disposed therein according to one or more embodiments described herein.

Turning now to a more detailed description of aspects of the present invention, FIG. 2 depicts a headlight assembly 200 having a light source 210 and a light obstruction sensor 220 disposed therein according to one or more embodiments described herein.

The headlight assembly 200 includes a body 202 and a surface 204, the surface 204 being of a suitable material to allow light to pass from the light source 210 within the headlight assembly 200 to an area external to the headlight assembly, as depicted by the arrows 212. The headlight assembly 200 also includes a reflective portion 206 and a non-reflection portion 208. The reflective portion 206 reflects light from the light source 210.

At times, the surface 204 of the headlight assembly 200 can become obstructed on impeded, such as by an object 216. The object 216 represents any article or item that causes light to be at least partially blocked from passing through the surface 204 and being visible outside the light assembly 200. For example, a leaf, snow, or other debris can accumulate on an external portion of the surface 204 and prevent the light from the light source 210 from passing through the surface 204 and being visible outside the light assembly 200. In another example, the object 216 represents a broken portion of the surface 204, such as a crack in the surface 204, a degrading of materials of the surface 204, etc. For example, if the surface 204 is formed out of plastic, the plastic might become clouded or otherwise obstructed over time due to ultraviolet light affecting the plastic. In such cases, the light from the light source 210 may be at least partially prevented from passing through the surface 204 and being visible outside the light assembly 200.

As shown by the arrow 214, light being emitted by the light source 210 may be reflected back into the headlight assembly 200 as shown by the arrow 218. This reflection may be caused by the object 216 for example. This reflected light, shown by the arrow 218, is sensed by a light obstruction sensor 220. The light obstruction sensor 220 can be any suitable sensor for detecting light levels and converting the sensed light into an electrical signal indicative of a level associated with the sensed light. For example, the light obstruction sensor 220 (also referred to as a photodetector or photosensor) can be a photovoltaic cell/sensor, although other types of sensors can be used.

When increased levels of light are detected by the light obstruction sensor 220, it can be determined that the light source 210 and/or the headlight assembly 200 is blocked, obstructed, or otherwise impeded. The headlight assembly 200 can further include a shroud 222 to partially encase the light obstruction sensor 220 from detecting light directly from the light source 210 and/or from the reflective portion 206 of the headlight assembly 200.

Figure 3:
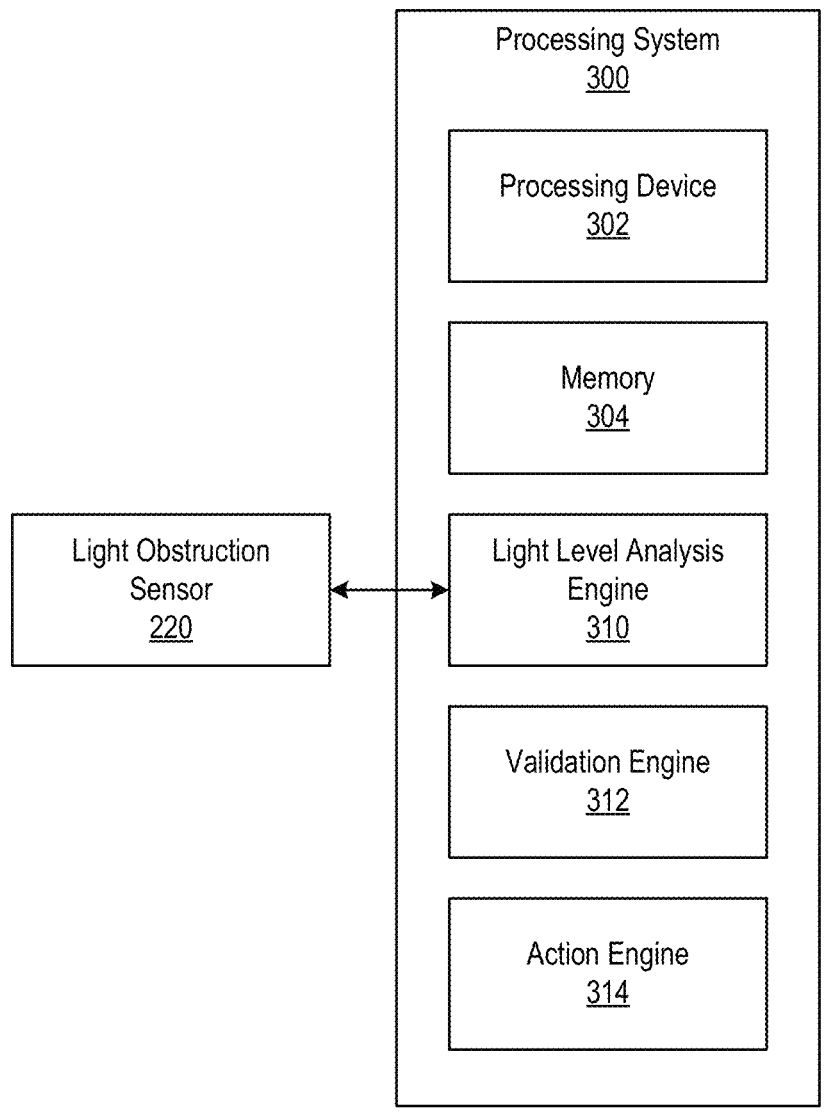
FIG. 3 depicts a block diagram of a processing system for detecting light obstruction using a light obstruction sensor according to one or more embodiments described herein.

FIG. 3 depicts a block diagram of a processing system 300 for detecting light obstruction using a light obstruction sensor 220 according to one or more embodiments described herein. The processing system 300 includes a processing device 302, a memory 304, a light level analysis engine 310, a validation engine 312, and an action engine 314.

The light obstruction sensor 220 receives light being emitted by the light source 210. The light level analysis engine 310 determines (or receives from the light obstruction sensor 220) a light level associated with the light emitted by the light source. The light level analysis engine 310 determines whether the light level exceeds a first threshold. The first threshold can be predetermined, set by a user, automatically determined (such as by using machine learning), adjusted, and the like. The first threshold is set such that an amount of light in excess of the first threshold indicates that the light source 210 is obstructed or impaired. For example, in the case of the light source 210 being disposed in a headlight assembly 200 of an automobile (not shown), the first threshold can be set such that if the threshold is met (or exceeded), it is likely that the headlight assembly 200 is damaged, obstructed, impaired, etc. such that light is not being projected from the headlight assembly 200 at a desirable level.

The light level analysis engine 310 can determine that the light being emitted by the light source 210 is at least partially impaired by an object (e.g., a leaf, snow, a broken headlight assembly, etc.) when it is determined that the light level exceeds the first threshold. This may indicate, for example, that leaves, snow, etc. (represented by object 216 in FIG. 2) have accumulated on the headlight assembly 200 and are obscuring or impairing the light from leaving the headlight assembly 200 and being projected in front of the vehicle as desired.

The validation engine 312 can validate the impairment determination performed by the light level analysis engine 310. For example, the validation engine 312 validates the determination that the light source 210 is at least partially impaired by the object 216 to confirm whether the light source is at least partially impaired by the object 216. The validation engine 312 accordingly prevents "false positives" or other incorrect determinations. In one example, the validation engine 312 compares the light level against a reference light level (e.g., from another light sensor in another headlight assembly or the like) to determine whether the two light levels are approximately equivalent or different. According to one or more embodiments described herein, the validation engine can receive historical light data stored in a data store (not shown). The historical light data indicates light levels sensed by the light obstruction sensor 220 over a period of time. In such examples, the validation engine 312 can use the historical light data to validate the impairment determination by comparing a current light level sensed by the light obstruction sensor 220 to the historical light data. Using the historical light data enables the validation engine 312 to account for passing light levels, such as those from on-coming vehicles, as well as slowly increasing or decreasing level, which can indicate small but increasing changes to the light source 210 for example.

When two light levels are approximately equivalent, the validation engine 312 determines that the impairment determination was incorrect. For example, if light from a sign, passing car, street light, etc., are detected by the light obstruction sensor 220, the light level may exceed the first threshold. When light obstruction sensors in both headlight assemblies detect this increase in light level, then the validation engine 312 determines that the impairment determination is inaccurate. That is, the headlight assembly 200 is not impaired or broken; rather, the increase in light level is caused by another source (e.g., the street light, passing car, etc.).

When two light levels are not approximately equivalent, the validation engine 312 validates the impairment determination. In such cases, the headlight assembly with the higher light level detected by the light obstruction sensor 220 is considered to be impaired, obstructed, broken etc. In such cases, the action engine 314 can implement a corrective action to account for or correct the light level of the impaired headlight assembly. For example, the action engine 314 can increase a light level of the light source 210 to account for or counteract the obstruction/impairment of the headlight assembly 200. In another example, the action engine 314 can schedule a service appointment to have the headlight assembly 200 serviced, order a replacement headlight assembly, alert an operator/user of the vehicle to the obstruction/impairment, cause a mechanical wiper (not shown) to attempt to remove the object causing the impairment/obstruction, and the like.

The various components, modules, engines, etc. described regarding FIG. 3 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 302 for executing those instructions. Thus a system memory (e.g., memory 304) can store program instructions that when executed by the processing device 302 implement the engines described herein. Other engines can also be utilized to include other features and functionality described in other examples herein. The functionality and features of the engines 310, 312, 314 are described further with reference to FIG. 4 and FIG. 5.

Figure 4:
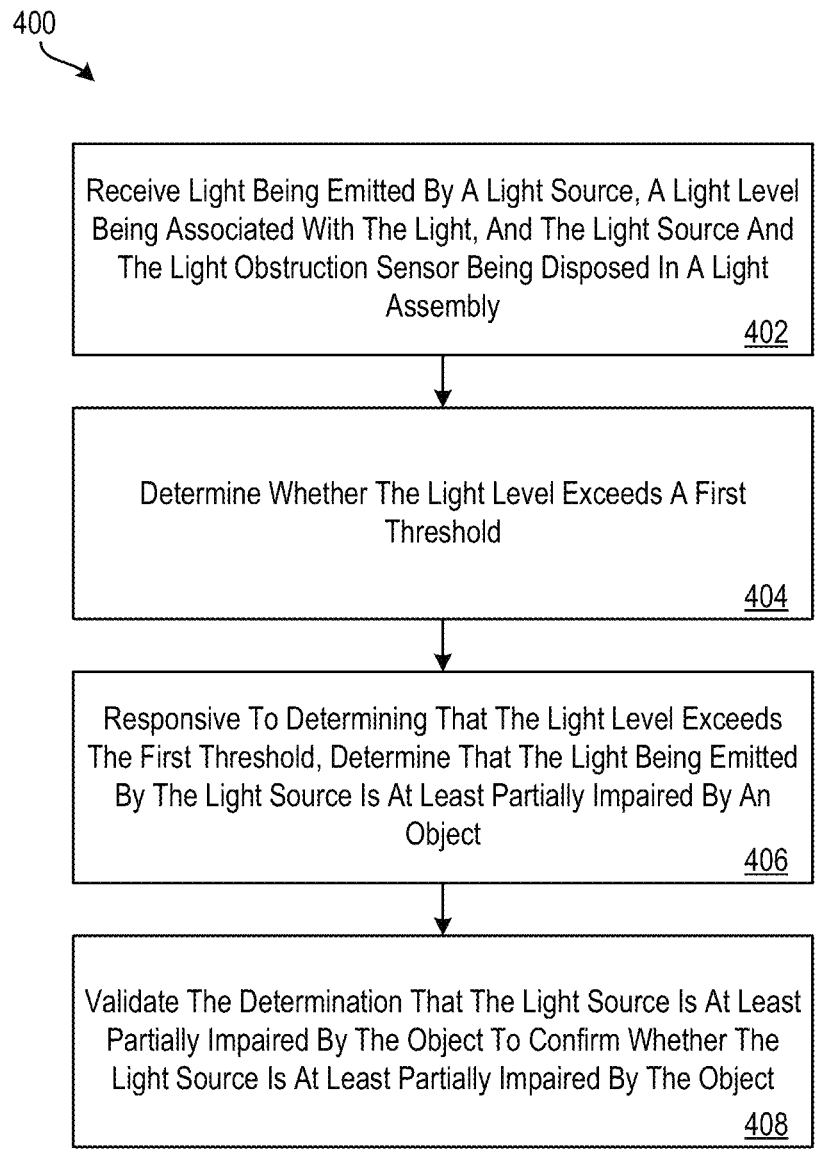
FIG. 4 depicts a flow diagram of a method for detecting light obstruction using a light obstruction sensor according to one or more embodiments described herein.

In particular, FIG. 4 depicts a flow diagram of a method 400 for detecting light obstruction using a light obstruction sensor 220 according to one or more embodiments described herein. The method 400 can be implemented using any suitable processing system (e.g., the processing system 100, the processing system 300, a cloud computing environment, etc.) and/or any suitable processing device (e.g., the processing device 121, the processing device 302, etc.).

At block 402, the light obstruction sensor 220 receives light being emitted by a light source 210. The light has a light level associated therewith. In one or more embodiments, the light source 210 and the light obstruction sensor 220 are disposed in a light assembly, such as the headlight assembly 200, which can be disposed in a vehicle (e.g., a car, truck, bus, van, motorcycle, airplane, helicopter, etc.).

At block 404, the light level analysis engine 310 determines whether the light level exceeds a first threshold. As described herein, the first threshold is set such that an amount of light in excess of the first threshold indicates that the light source 210 (or the headlight assembly 200) is obstructed or impaired, such as due to leaves, snow, degraded plastic caused by ultraviolet light damage over time, etc.

At block 406, the light level analysis engine 310 determines that the light being emitted by the light source 210 is at least partially impaired by an object (e.g., the object 216) responsive to determining that the light level exceeds the first threshold.

At block 408, the validation engine 312 validates the determination that the light source 210 is at least partially impaired by the object 216 to confirm whether the light source 210 is at least partially impaired by the object 216. According to one or more embodiments described herein, the validating can further include comparing the light level to a reference light level. In such cases, the validation engine 312 confirms (validates) that the light source 210 is at least partially impaired by the object when the light level is not substantially equivalent to a reference light level. However, the validation engine 312 does not confirm that the light source 210 is at least partially impaired by the object when the light level is substantially equivalent to a reference light level. The reference light can be detected by a light sensor on another part of the vehicle, such as in another headlight assembly, as part of an automatic headlight or windshield wiper detection assembly, or an additional light sensor on a vehicle.

Additional processes also may be included. For example, the light level analysis engine 310 can determine whether the light level is less than a second threshold. Responsive to determining that the light level is less than the second threshold, the light level analysis engine 310 determines that the light source 210 is inoperable (e.g., a light bulb in the light source 210 is burned out, broken, etc.). When it is determined that the light source 210 is inoperable, the action engine 314 can implement a corrective action as described herein.

Figure 5:
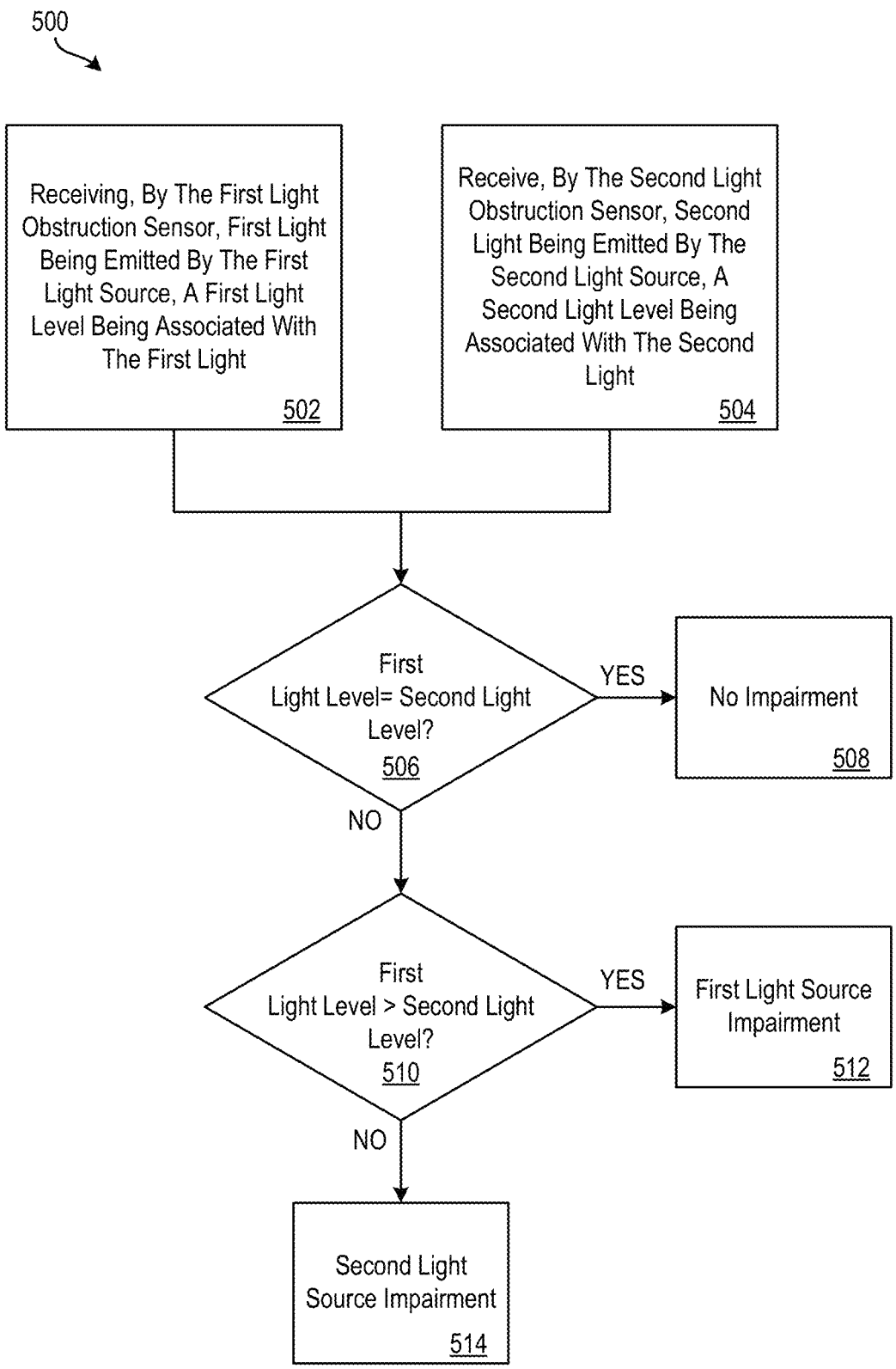
FIG. 5 depicts a flow diagram of a method for detecting light obstruction using a light obstruction sensor according to one or more embodiments described herein.

It should be understood that the process depicted in FIG. 5 represents an illustration, and that other processes may be added or existing processes may be removed, modified, or rearranged without departing from the scope and spirit of the present disclosure.

FIG. 5 depicts a flow diagram of a method 500 for detecting light obstruction using a light obstruction sensor 220 according to one or more embodiments described herein. The method 500 can be implemented using any suitable processing system (e.g., the processing system 100, the processing system 300, a cloud computing environment, etc.) and/or any suitable processing device (e.g., the processing device 121, the processing device 302, etc.).

At block 502, a first light obstruction sensor (e.g., the light obstruction sensor 220) receives first light being emitted by a first light source (e.g., the light source 210). A first light level is associated with the first light.

At block 504, a second light obstruction sensor receives second light being emitted by a second light source. A second light level is associated with the second light.

At decision block 506, it is determined whether the first light level is approximately equal to the second light level. If it is determined that the first light level is approximately equal to the second light level, it is determined at block 508 that neither the first nor the second light assembly is impaired. According to one or more embodiments described herein, if it is determined that the first light level is approximately equal to the second light level at decision block 506, the method 500 includes performing additional testing, such as comparing the first light level and/or the second light level to historical light data. The additional testing can also include comparing the first light level and/or the second light level to a reference light level. By performing additional testing, the impairment determination can be validated. This can prevent "false positives" or otherwise incorrect determinations of no impairment by performing secondary validation (e.g., to historical light data, to a reference light level, etc.)

However, if it is determined at decision block 506 that the first light level is not approximately equal to the second light level, it is determined at decision block 510 whether the first light level is greater than the second light level. If so, it is determined that the first light source is impaired at block 512. However, if not, it is determined that the second light source is impaired at block 514.

Additional processes also may be included, and it should be understood that the process depicted in FIG. 5 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a light obstruction sensor, light being emitted by a light source, a light level being associated with the light received by the light obstruction sensor, and the light source and the light obstruction sensor being disposed in a light assembly of a vehicle, the light assembly comprising a body portion and a surface portion, the light source and the light obstruction sensor being disposed in the body portion;
   receiving, by a reference light obstruction sensor, the light being emitted by the light source, a reference light level being associated with the light received by the reference light obstruction sensor, wherein the reference light obstruction sensor is disposed in the vehicle other than in the light assembly;
   determining, by a processing device, whether an object is on the surface portion of the light assembly by:
      determining, by the processing device, whether the light level exceeds a first threshold; and
      responsive to determining that the light level exceeds the first threshold, determining that the light being emitted by the light source is at least partially impaired by the object on the surface portion of the light assembly; and
   validating, by the processing device, the determination that the light source is at least partially impaired by the object to confirm whether the light source is at least partially impaired by the object on the surface portion of the light assembly by comparing the light level to the reference light level.

2. The computer-implemented method of claim 1, further comprising:
   determining, by the processing device, whether the light level is less than a second threshold, the second threshold being less than the first threshold.

3. The computer-implemented method of claim 2, further comprising:
   responsive to determining that the light level is less than the second threshold, determining that the light source is inoperable.

4. The computer-implemented method of claim 3, further comprising:
   responsive to determining that the light source is inoperable, implementing a corrective action.

5. The computer-implemented method of claim 1, wherein the light assembly is a headlight assembly disposed in the vehicle.

6. The computer-implemented method of claim 1, wherein it is confirmed that the light source is at least partially impaired by the object when the light level is not substantially equivalent to the reference light level.

7. The computer-implemented method of claim 1, wherein it is not confirmed that the light source is at least partially impaired by the object when the light level is substantially equivalent to the reference light level.

8. The computer-implemented method of claim 1, wherein it is confirmed that the light source is at least partially impaired by the object when the light level is not substantially equivalent to the reference light level, and wherein it is not confirmed that the light source is at least partially impaired by the object when the light level is substantially equivalent to the reference light level.

9. The computer-implemented method of claim 1, wherein the validating is based at least in part on historical light data.

10. A system comprising:
    a vehicle comprising a headlight assembly, the headlight assembly comprising a light source, a light obstruction sensor, a body portion, and a surface portion, the light source and the light obstruction sensor being disposed in the body portion;
    a memory comprising computer readable instructions; and
    a processing device for executing the computer readable instructions for performing a method comprising:
       receiving, by the light obstruction sensor, light being emitted by the light source, a light level being associated with the light received by the light obstruction sensor;
       receiving, by a reference light obstruction sensor, the light being emitted by the light source, a reference light level being associated with the light received by the reference light obstruction sensor;
       determining whether an object is on the surface portion of the light assembly by:
          determining whether the light level exceeds a threshold; and
          responsive to determining that the light level exceeds the threshold, determining that the light being emitted by the light source is at least partially impaired by the object on the surface portion of the light assembly; and
       validating the determination that the light source is at least partially impaired by the object to confirm whether the light source is at least partially impaired by the object on the surface portion of the light assembly by comparing the light level to the reference light level.

11. A computer program product comprising:
a computer readable storage medium having program instructions embodied therewith, the program instructions executable by a processing device to cause the processing device to perform a method comprising:
receiving, by a light obstruction sensor, light being emitted by a light source, a light level being associated with the light received by the light obstruction sensor, and the light source and the light obstruction sensor being disposed in a light assembly of a vehicle, the light assembly comprising a body portion and a surface portion, the light source and the light obstruction sensor being disposed in the body portion;
receiving, by a reference light obstruction sensor, the light being emitted by the light source, a reference light level being associated with the light received by the reference light obstruction sensor, wherein the reference light obstruction sensor is disposed in the vehicle other than in the light assembly;
determining, by the processing device, whether an object is on the surface portion of the light assembly by:
determining, by the processing device, whether the light level exceeds a first threshold; and
responsive to determining that the light level exceeds the first threshold, determining that the light being emitted by the light source is at least partially impaired by the object on the surface portion of the light assembly; and
validating, by the processing device, the determination that the light source is at least partially impaired by the object to confirm whether the light source is at least partially impaired by the object on the surface portion of the light assembly by comparing the light level to the reference light level.

12. The computer program product of claim 11, wherein the method further comprises:
determining, by the processing device, whether the light level is less than a second threshold, the second threshold being less than the first threshold.

13. The computer program product of claim 12, wherein the method further comprises:
responsive to determining that the light level is less than the second threshold, determining that the light source is inoperable.

14. The computer program product of claim 13, wherein the method further comprises:
responsive to determining that the light source is inoperable, implementing a corrective action.

15. The computer program product of claim 11, wherein the light assembly is a headlight assembly disposed in the vehicle.

16. The computer program product of claim 11, wherein it is confirmed that the light source is at least partially impaired by the object when the light level is not substantially equivalent to the reference light level.

17. The computer program product of claim 11, wherein it is not confirmed that the light source is at least partially impaired by the object when the light level is substantially equivalent to the reference light level.

* * * * *